United States Patent
Yano et al.

(12)

(10) Patent No.: US 6,223,106 B1
(45) Date of Patent: Apr. 24, 2001

(54) CONTROL SYSTEM FOR HYBRID VEHICLE

(75) Inventors: Toru Yano; Yutaka Tamagawa; Shigeru Aoki; Shigeru Ibaraki; Eiji Kitsutaka, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/313,973

(22) Filed: May 19, 1999

(30) Foreign Application Priority Data

May 20, 1998 (JP) .................................................. 10-137930

(51) Int. Cl.[7] ...................................................... B60L 1/02
(52) U.S. Cl. ............................ 701/22; 180/165; 180/65.2; 320/166
(58) Field of Search ............................... 701/22; 180/165, 180/65.2; 477/7; 320/103, 104, 118, 166, 122; 322/16

(56) References Cited

U.S. PATENT DOCUMENTS 5,532,572 * 7/1996 Okamura ................................... 320/1
5,839,533 * 11/1998 Mikami et al. ........................ 180/165

OTHER PUBLICATIONS

U.S. Patent Appln. S.N. 09/280,707; filed: Mar. 30, 1999 Title: Control System for Hybrid Vehicle.

* cited by examiner

Primary Examiner—William A. Cuchlinski, Jr.
Assistant Examiner—Arthur Donnelly
(74) Attorney, Agent, or Firm—Arent Fox Kintner Plotkin & Kahn, PLLC

(57) ABSTRACT

A control system for a hybrid vehicle prevents a voltage across an electric energy storage device from dropping excessively when the electric energy storage device is discharged with a generator/motor operating as an electric motor, for thereby effectively utilizing electric energy stored in the electric energy storage device as much as possible to operate the generator/motor as the electric motor. The control system also prevents the voltage across the electric energy storage device from rising excessively when the electric energy storage device is charged with the generator/motor operating as an electric generator, for thereby charging the electric energy storage device with electric energy generated by the generator/motor as much as possible while protecting the electric energy storage device. The control system controls operation of the generator/motor to keep a charging and discharging current of the electric energy storage device at a level equal to or smaller than a limiting value determined depending on the amount of electric energy stored in electric energy storage device and the temperature thereof when the generator/motor operates as the electric generator or motor.

9 Claims, 12 Drawing Sheets

CONTROL SYSTEM FOR HYBRID VEHICLE

BACKGROUND OF THE INVENTION

1. Field of the Invention

The present invention relates to a control system for controlling a parallel hybrid vehicle.

2. Description of the Related Art

Parallel hybrid vehicles comprise an engine as a main propulsive source of a vehicle, a generator/motor capable of operating as both an electric generator and an electric motor, and an electric energy storage device such as a battery, a capacitor, or the like for supplying electric energy to and receiving electric energy from the generator/motor. For accelerating the vehicle, the electric energy storage device supplies the generator/motor with electric energy to operate the generator/motor as an electric motor to generate an assistive mechanical output to assist in the output of the engine, i.e., vehicle propulsion forces. For decelerating the vehicle, the generator/motor is operated as an electric motor by the kinetic energy of the vehicle for regenerating electric energy, and the regenerated electric energy is supplied to charge the electric energy storage device.

The voltage occurring between the positive and negative terminals of the electric energy storage device varies due to the internal resistance of the electric energy storage device when the electric energy storage device is discharged or charged. For example, when the electric energy storage device is discharged, i.e., the electric energy storage device supplies stored electric energy to the generator/motor, with the generator/motor operating as the electric motor, the voltage across the electric energy storage device becomes lower than the voltage in a steady state, i.e., the open voltage, of the electric energy storage device due to the internal resistance thereof. When the electric energy storage device is charged with the generator/motor operating as the electric generator, the voltage across the electric energy storage device becomes higher than the voltage in the steady state, i.e., the open voltage, of the electric energy storage device due to the internal resistance thereof. If the electric energy storage device comprises an electric double-layer capacitor, for example, then since the internal resistance thereof is relatively high, the above tendency manifests itself. A reduction in the voltage across the electric energy storage device when the electric energy storage device is discharged, or an increase in the voltage across the electric energy storage device when the electric energy storage device is charged, is greater as the current flowing through the electric energy storage device is greater.

On hybrid vehicles, the assistive output generated by the generator/motor operating as the electric motor and the quantity of electric energy generated by the generator/motor operating as the electric generator are determined depending on operating states of the vehicle, such as the vehicle speed. In this case, a discharging current or a charging current of the electric energy storage device may be relatively large.

If the current (discharging current) flowing through the electric energy storage device becomes large when the electric energy storage device is discharged with the generator/motor operating as the electric motor, then the voltage across the electric energy storage device greatly drops due to the internal resistance of the electric energy storage device, tending to make it difficult for the generator/motor to operate properly as the electric motor.

If the current (charging current) flowing through the electric energy storage device becomes large when the electric energy storage device is charged with the generator/motor operating as the electric generator, then the voltage across the electric energy storage device greatly rises due to the internal resistance of the electric energy storage device, resulting in the application of an excessive voltage to the electric energy storage device, which then tends to deteriorate soon.

It has been attempted to monitor the voltage across the electric energy storage device while the hybrid vehicle is in operation. When the monitored voltage across the electric energy storage device drops below a given lower limit voltage, the supply of electric energy from the electric energy storage device to the generator/motor is stopped to stop operating the generator/motor as the electric motor. When the monitored voltage across the electric energy storage device rises above a given upper limit voltage, the charging of the electric energy storage device with the generator/motor operating as the electric generator is stopped to protect the electric energy storage device.

As described above, when the electric energy storage device is discharged, the voltage across the electric energy storage device drops due to the internal resistance thereof. Therefore, even if the electric energy storage device stores an amount of electric energy large enough to operate the generator/motor as the electric motor, the voltage across the electric energy storage device is liable to drop below the lower limit voltage for thereby stopping operating the generator/motor as the electric motor. When this situation occurs, it is impossible to effectively utilize the electric energy stored by the electric energy storage device.

Conversely, when the electric energy storage device is charged by electric energy generated by the generator/motor, the voltage across the electric energy storage device rises due to the internal resistance thereof. Therefore, when generator/motor generates electric energy upon deceleration of the vehicle, the voltage across the electric energy storage device is liable to rise above the upper limit voltage for thereby stopping operating the generator/motor as the electric generator for regenerating electric energy. When this happens, it is impossible to effectively recover the kinetic energy of the vehicle in the electric energy storage device.

SUMMARY OF THE INVENTION

It is therefore an object of the present invention to provide a control system for controlling a hybrid vehicle to prevent a voltage across an electric energy storage device from dropping excessively when the electric energy storage device is discharged with a generator/motor operating as an electric motor, for thereby effectively utilizing electric energy stored in the electric energy storage device as much as possible to operate the generator/motor as the electric motor.

Another object of the present invention is to provide a control system for controlling a hybrid vehicle to prevent a voltage across an electric energy storage device from rising excessively when the electric energy storage device is charged with a generator/motor operating as an electric generator, for thereby charging the electric energy storage device with electric energy generated by the generator/motor as much as possible while protecting the electric energy storage device.

According to the present invention, there is provided a control system for controlling a hybrid vehicle having an engine as a vehicle propulsion source, an electric energy storage device for storing electric energy, and a generator/motor for selectively operating as an electric motor for generating an assistive output to assist in an output of the engine from the electric energy stored in the electric energy storage device and as an electric generator for generating electric energy to be stored in the electric energy storage device, the control system comprising generator/motor control means for controlling operation of the generator/motor to maintain a current passing through the electric energy storage device at a level equal to or smaller than a predetermined limiting value established depending on the amount of electric energy stored in the electric energy storage device, when the generator/motor operates as the electric motor or the electric generator.

There is established a limiting value for the current passing through the electric energy storage device when the generator/motor operates as the electric motor, i.e., a discharging current, and the current is kept equal to or smaller than the limiting value. Therefore, the voltage between the positive and negative terminals of the electric energy storage device is prevented from unduly dropping due to the internal resistance of the electric energy storage device when the generator/motor operates as the electric motor to generate an assistive output. Since the limiting value is determined depending on the amount of electric energy stored in the electric energy storage device, the voltage across the electric energy storage device is kept at a voltage level capable of operating the generator/motor as the electric motor as much as possible, while at the same time as much stored electric energy as possible is supplied from the electric energy storage device to the generator/motor to operate the generator/motor as the electric motor.

Similarly, there is established a limiting value for the current passing through the electric energy storage device when the generator/motor operates as the electric generator, i.e., a charging current, and the current is kept equal to or smaller than the limiting value. Therefore, the voltage across the electric energy storage device is prevented from unduly increasing due to the internal resistance of the electric energy storage device when the generator/motor operates as the electric generator to charge the electric energy storage device. Since the limiting value is determined depending on the amount of electric energy stored in the electric energy storage device, no excessive voltage is applied across the electric energy storage device, while at the same time as much electric energy generated by the generator/motor as possible is supplied to charge the electric energy storage device.

Consequently, when the electric energy storage device is discharged with the generator/motor operating as the electric motor, the voltage across the electric energy storage device is prevented from unduly dropping, and the electric energy stored in the electric energy storage device can effectively be utilized as much as possible to operate the generator/motor as the electric motor. When the electric energy storage device is charged with the generator/motor operating as the electric generator, the voltage across the electric energy storage device is prevented from unduly increasing, and the electric energy generated by the generator/motor can be supplied as much as possible to charge the electric energy storage device while protecting the electric energy storage device.

The generator/motor control means may comprise means for increasing the limiting value as the amount of electric energy stored in the electric energy storage device is greater when the generator/motor operates as the electric motor.

The generator/motor control means may comprise means for reducing the limiting value as the amount of electric energy stored in the electric energy storage device is greater when the generator/motor operates as the electric generator.

The steady voltage across the electric energy storage device, i.e., the voltage across the electric energy storage device when no current flows therethrough, is basically higher as the amount of electric energy stored therein is greater, and lower as the amount of electric energy stored therein is smaller.

Therefore, when the generator/motor operates as the electric motor with the electric energy storage device being discharged, the limiting value for the current passing through the electric energy storage device is increased as the amount of electric energy stored therein is greater, i.e., as the steady voltage across the electric energy storage device is higher. In this manner, the voltage across the electric energy storage device is prevented from unduly dropping, and as much stored electric energy as possible from the electric energy storage device is used to operate the generator/motor as the electric motor.

Likewise, when the generator/motor operates as the electric generator with the electric energy storage device being charged, the limiting value for the current passing through the electric energy storage device is reduced as the amount of electric energy stored therein is greater, i.e., as the steady voltage across the electric energy storage device is higher. In this manner, the voltage across the electric energy storage device is prevented from unduly increasing, and as much stored electric energy generated by the generator/motor as possible is supplied to charge the electric energy storage device.

For limiting the current passing through the electric energy storage device, i.e., the charging current thereof, when the generator/motor operates as the electric motor, the control system may further comprise current detecting means for detecting the current passing through the electric energy storage device, and the generator/motor control means may comprise means for establishing a target value of the assistive output when the generator/motor operates as the electric motor depending on at least an operating state of the hybrid vehicle and/or the amount of electric energy stored in the electric energy storage device, correcting the target value of the assistive output so as to be reduced when the current detected by the current detecting means exceeds the limiting value when the generator/motor operates as the electric motor, and controlling operation of the generator/motor depending on the corrected target value to keep the current passing through the electric energy storage device at the level equal to or smaller than the predetermined limiting value.

Similarly, for limiting the current passing through the electric energy storage device, i.e., the discharging current thereof, when the generator/motor operates as the electric generator, the control system may further comprise current detecting means for detecting the current passing through the electric energy storage device, and the generator/motor control means may comprise means for establishing a target value of the quantity of electric energy generated when the generator/motor operates as the electric generator depending on at least an operating state of the hybrid vehicle and/or the amount of electric energy stored in the electric energy storage device, correcting the target value of the quantity of generated electric energy so as to be reduced when the current detected by the current detecting means exceeds the limiting value when the generator/motor operates as the electric generator, and controlling operation of the generator/motor depending on the corrected target value to keep the current passing through the electric energy storage device at the level equal to or smaller than the predetermined limiting value.

When the generator/motor operates as the electric motor, a target value of the assistive output to be generated by the generator/motor is establishing depending on the operating state of the hybrid vehicle and/or the amount of electric energy stored in the electric energy storage device, and operation of the generator/motor to generate the assistive output is controlled depending on the target value of the assistive output for thereby causing the generator/motor to generate the assistive output suitable for a running mode of the hybrid vehicle and the electric energy storage state of the electric energy storage device. When the current passing through the electric energy storage device, i.e., the discharging current thereof, as detected by the current detecting means exceeds the limiting value upon the operation of the generator/motor as the electric motor, the target value of the assistive output is corrected so as to be reduced, and the operation of the generator/motor is controlled depending on the corrected target value for thereby keeping the current passing through the electric energy storage device equal to or smaller than the limiting value.

Similarly, when the generator/motor operates as the electric generator, a target value of the quantity of generated electric energy of the generator/motor is establishing depending on the operating state of the hybrid vehicle and/or the amount of electric energy stored in the electric energy storage device, and operation of the generator/motor to generate the electric energy is controlled depending on the target value of the assistive output for thereby causing the generator/motor to generate the electric energy (to charge the electric energy storage device) suitable for a running mode of the hybrid vehicle and the electric energy storage state of the electric energy storage device. When the current passing through the electric energy storage device, i.e., the charging current thereof, as detected by the current detecting means exceeds the limiting value upon the operation of the generator/motor as the electric generator, the target value of the quantity of generated electric energy is corrected so as to be reduced, and the operation of the generator/motor is controlled depending on the corrected target value for thereby keeping the current passing through the electric energy storage device equal to or smaller than the limiting value.

The operating state of the hybrid vehicle based on which to establish the target value of the assistive output or the target value of the quantity of generated electric energy may be a vehicle speed of the hybrid vehicle, an operated quantity of the accelerator pedal of the hybrid vehicle, an opening of the throttle valve of the engine, a rotational speed of the engine, or a rate of change of each of these parameters.

Preferably, the generator/motor control means may comprise means for, after the target value of the assistive output is corrected so as to be reduced, canceling correcting the target value of the assistive output so as to be reduced when the current detected by the current detecting means is smaller than the limiting value when the generator/motor operates as the electric motor.

Preferably, the generator/motor control means may comprise means for, after the target value of the quantity of generated electric energy is corrected so as to be reduced, canceling correcting the target value of the quantity of generated electric energy so as to be reduced when the current detected by the current detecting means is smaller than the limiting value when the generator/motor operates as the electric generator.

With the above arrangement, in order to keep the current passing through the electric energy storage device equal to or smaller than the limiting value, the correction to reduce the target value of the assistive output and the target value of the quantity of generated electric energy can be minimized.

Preferably, the generator/motor control means may comprise means for determining the limiting value depending on the amount of electric energy stored in the electric energy storage device and the temperature of the electric energy storage device.

The internal resistance of the electric energy storage device generally varies depending on the temperature of the electric energy storage device, i.e., the ambient temperature of the electric energy storage device. The limiting value is made optimum since it is determined depending on not only the amount of electric energy stored in the electric energy storage device, but also the temperature thereof.

The electric energy storage device may comprise a battery. However, the electric energy storage device should preferably comprise an electric double-layer capacitor because the electric double-layer capacitor generally has a high internal resistance and the voltage across the electric double-layer capacitor tends to drop or rise easily when it is charged and discharged.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
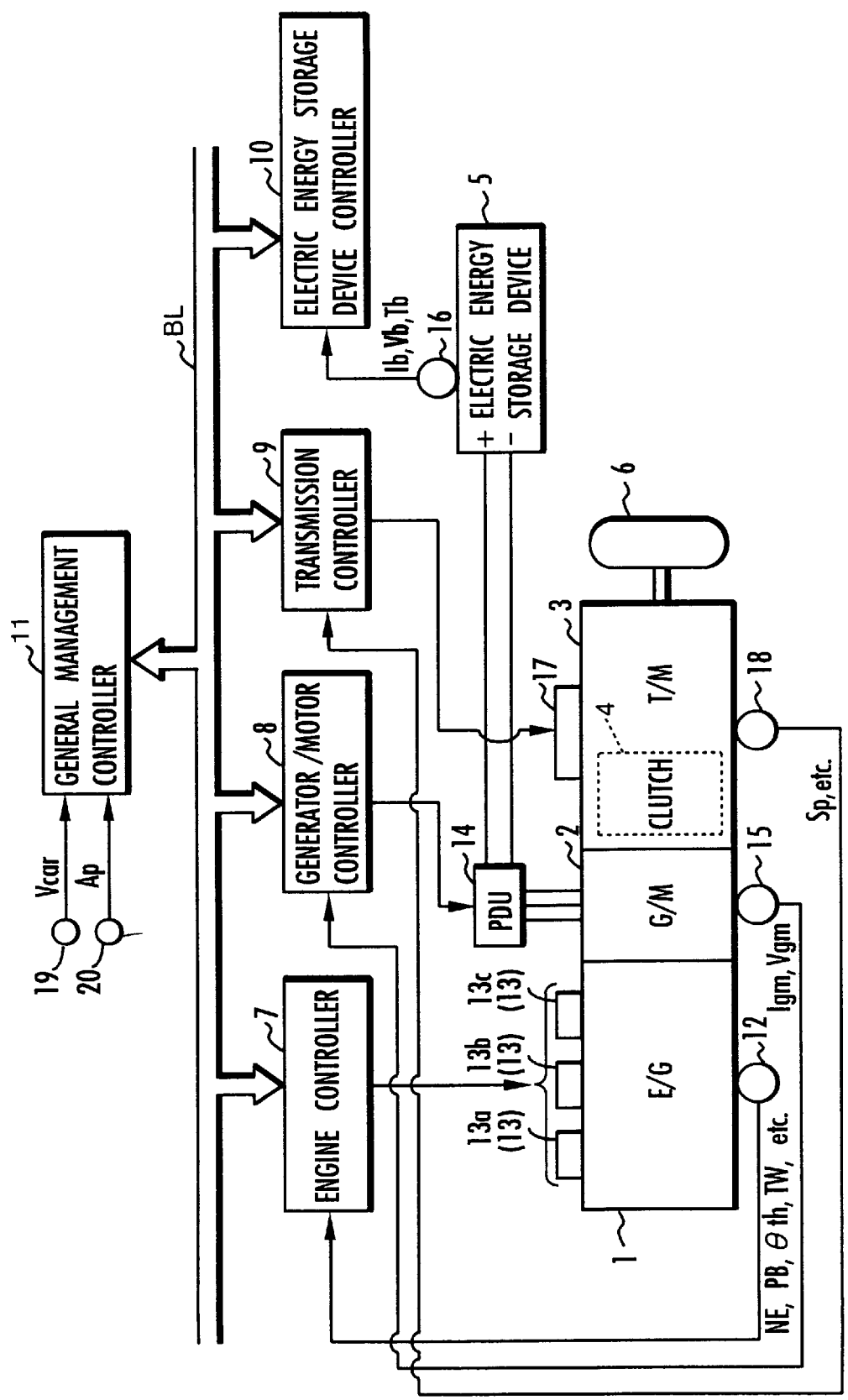
FIG. 1 is a block diagram of a control system for a hybrid vehicle according to the present invention.

FIG. 1 shows in block form a control system for a hybrid vehicle according to the present invention.

As shown in FIG. 1, the hybrid vehicle has an internal combustion engine 1 which is operatively connected to drive wheels 6 (only one shown) through a generator/motor 2 and a transmission 3 including a clutch 4. The hybrid vehicle also has an electric energy storage device 5. The control system includes an engine controller 7, a generator/motor controller 8, a transmission controller 9, an electric energy storage device controller 10, and a general management controller 11.

The internal combustion engine 1 serves as a main propulsive source of the hybrid vehicle, and transmits its mechanical output from an output shaft (crankshaft) via the generator/motor 2 and the transmission 3 to the drive wheels 6 for thereby propelling the hybrid vehicle.

The internal combustion engine 1 is associated with a detecting device (hereinafter referred to as an "engine sensor") 12 for detecting various operating states of the internal combustion engine 1, including a rotational speed NE, an intake pressure PB, a temperature TW, an opening θth of a throttle valve (intake control valve) (hereinafter referred to as a "throttle valve opening θth"). The engine sensor 12 supplies detected data representing the operating states of the internal combustion engine 1 to the engine controller 7.

The internal combustion engine 1 is also associated with various engine actuating mechanisms including an ignition unit 13a for igniting an air-fuel mixture supplied to the internal combustion engine 1, a fuel supply unit 13b for supplying fuel to the internal combustion engine 1, and a throttle vale actuator 13c for actuating a throttle valve. These engine actuating mechanisms 13a, 13b, 13c will collectively be referred to as an engine actuating device 13.

The generator/motor 2 has a rotor (not shown) connected coaxially to the output shaft of the engine 1 and an armature coil (not shown) connected electrically to the positive and negative terminals of the electric energy storage device 5 via an energization control circuit 14 (hereinafter referred to as a "PDU 14") which comprises a regulator and an inverter circuit.

The generator/motor 2 can selectively operate as an electric motor energized by electric energy stored in the electric energy storage device 5, for generating an assistive output to assist in the output of the internal combustion engine 1, i.e., an assistive vehicle propulsion power to be transmitted together with the output of the internal combustion engine 1 to the drive wheels 6, and an electric generator actuated by kinetic energy transmitted from the drive wheels 6 and a portion of the output of the internal combustion engine 1 upon deceleration of the vehicle, for generating electric energy to be charged in the electric energy storage device 5. The operation of the generator/motor 2 as the electric motor is referred to as assistive operation, and the operation of the generator/motor 2 as the electric generator is referred to as regenerative operation. The assistive operation and the regenerative operation are performed by controlling the transfer of electric energy between the electric energy storage device 5 and the generator/motor 2 with the PDU 14.

A detecting device 15 (hereinafter referred to as a "generator/motor sensor 15") is combined with the generator/motor 2 for detecting a current Igm and a voltage Vgm of the armature coil of the generator/motor 2. The generator/motor sensor 15 supplies detected data representing the current Igm and the voltage Vgm to the generator/motor controller 8.

The electric energy storage device 5 comprises an electric double-layer capacitor. The electric energy storage device 5 is associated with a detecting device 16 (hereinafter referred to as a "capacitor sensor 16") for detecting a charging and discharging current Ib of the electric energy storage device 5 (a current passing through the electric energy storage device 5), a voltage Vb across the electric energy storage device 5 (a voltage between the positive and negative terminals of the electric energy storage device 5), and a temperature Tb of the electric energy storage device 5 (an ambient temperature of the electric energy storage device 5). The capacitor sensor 16 supplies detected data representing the charging and discharging current Ib, the voltage Vb, and the temperature Tb to the electric energy storage device controller 10. The charging and discharging current Ib detected by the capacitor sensor 16 includes a charging current Ibc flowing into the electric energy storage device 5, and a discharging current Ibd flowing out of the electric energy storage device 5. The capacitor sensor 16 is capable of these charging and discharging currents Ibc, Ibd distinguishably from each other.

The electric energy storage device 5 is also capable of supplying stored electric energy via a DC/DC converter to a 12V-battery, whose voltage is lower than the voltage of the electric energy storage device 5, and various vehicle-mounted electric accessories including an air-conditioning unit, an audio system, etc. While the electric energy storage device 5 comprises an electric double-layer capacitor in the illustrated embodiment, the electric energy storage device 5 may comprise a secondary battery such as a storage battery.

The clutch 4 serves to connect the internal combustion engine 1 and the generator/motor 2 to the drive wheels 6 and disconnect the internal combustion engine 1 and the generator/motor 2 from the drive wheels 6. The transmission 3 serves to transmit the power from the internal combustion engine 1 to the drive wheels 6 at various speed reduction ratios. The transmission 3 is associated with an actuator 17 for changing speed reduction ratios and engaging and disengaging the clutch 4. The transmission 3 is also associated with a detecting device 18 (hereinafter referred to as a "transmission sensor 18") for detecting operating states of the transmission 3 including an shifted position SP of a gear shift lever (not shown) which can be operated by the driver of the hybrid vehicle to select operating states of the transmission 3. The transmission sensor 18 supplies detected data representing the operating states of the transmission 3 to the transmission controller 9.

The controllers 7–11 are implemented by a microcomputer and electrically interconnected by a bus line BL for exchanging various data therebetween.

Of these controllers 7–11, the engine controller 7 serves to control operation of the internal combustion engine 1 with the engine actuating device 13, the generator/motor controller 8 to control operation of the generator/motor 2 with the PDU 14, and the transmission controller 9 to control operation of the transmission 3 (including the clutch 4) with the actuator 17.

The electric energy storage device controller 10 serves to sequentially grasp a quantity of electric energy (remaining capacity) stored in the electric energy storage device 5 based on the detected data (the charging and discharging current Ib, the voltage Vb, and the temperature Tb of the electric energy storage device 5) from the capacitor sensor 16.

The general management controller 11 serves to manage general operation of the control system according to the present embodiment. Specifically, the general management controller 11 grasps required operating states of the hybrid vehicle, determines target operating states (specifically, a command value for the throttle valve opening θth of the internal combustion engine 1, a target assistive output of the generator/motor 2 in the assistive operation or a target quantity of generated electric energy of the generator/motor 2 in the regenerative operation) of the internal combustion engine 1 and the generator/motor 2 which correspond to the grasped operating states of the hybrid vehicle, and indicates the target operating states to the engine controller 7 and the generator/motor controller 8. In order to carry out the above process, the general management controller 11 is supplied with detected data from a sensor 19 which detects a vehicle speed Vcar and a sensor 20 which detects an operated quantity Ap (hereinafter referred to as an "accelerator operation quantity Ap") of the accelerator pedal (not shown) of the hybrid vehicle.

The generator/motor controller 8 and the general management controller 11 correspond to a generator/motor control means, and the capacitor sensor 16 functions as a passing current detecting means.

Basic operation of the hybrid vehicle as it runs will be described below.

Figure 2:
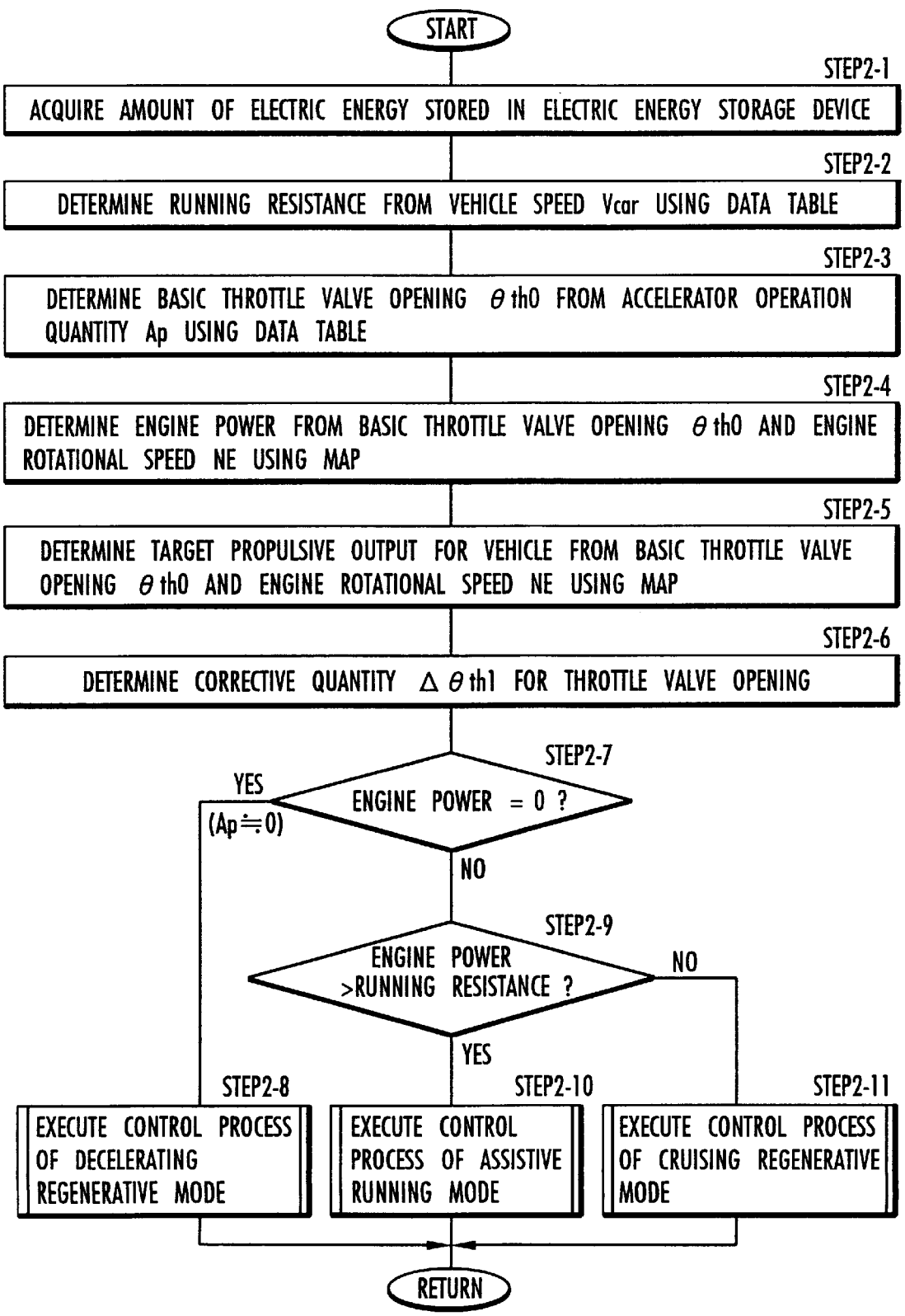
FIG. 2 is a flowchart of a processing sequence of the control system shown in FIG. 1.

When the hybrid vehicle runs, the general management controller 11 performs a processing sequence shown in FIG. 2 in predetermined control cycles.

The general management controller 11 acquires data of the amount of electric energy stored in the electric energy storage device 5 from the electric energy storage device controller 10 in STEP2-1.

The electric energy storage device controller 10 sequentially grasps the amount of electric energy stored in the electric energy storage device 5 in a manner described below, and supplies the grasped amount of electric energy to the general management controller 11.

The electric energy storage device controller 10 determines the product (Ib·Vb) of detected values of the charging and discharging current Ib and the voltage Vb of the electric energy storage device 5 from the capacitor sensor 16, i.e., a charged and discharged electric energy of the electric energy storage device 5, in each given control cycle. The charged and discharged electric energy (Ib·Vb) thus determined is in substantial agreement with the electric energy which is supplied to the generator/motor 2 in the assistive operation, and with the electric energy which is generated by the generator/motor 2 in the regenerative operation.

Figure 7:
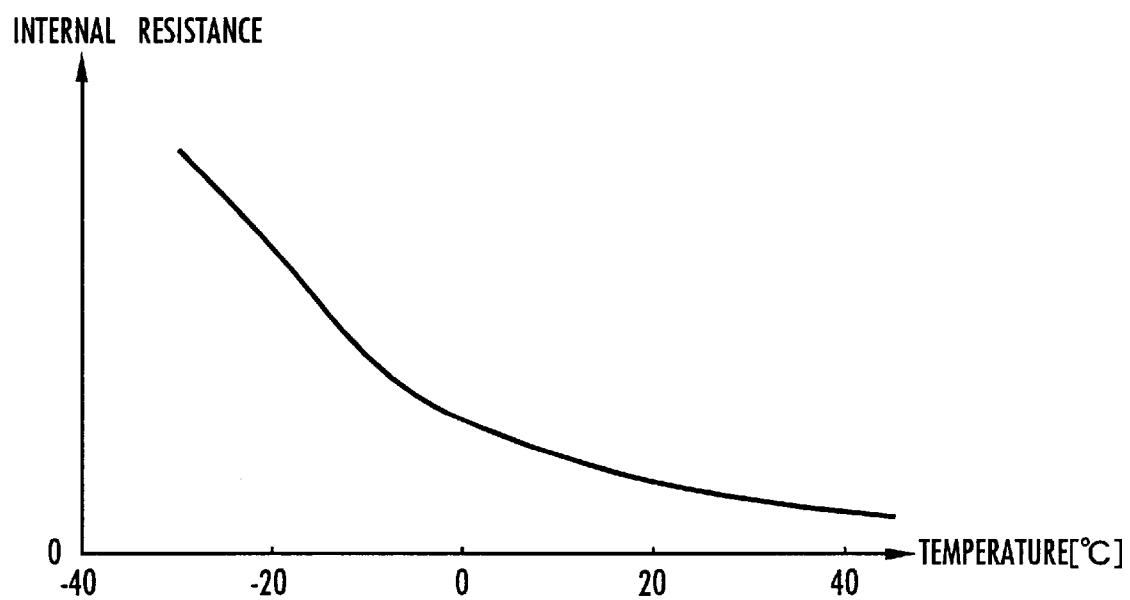
FIG. 7 is a data table showing the relationship between internal resistances and temperatures of an electric energy storage device.

The electric energy storage device controller 10 then determines an internal resistance of the electric energy storage device 5 from detected data of the temperature Tb of the electric energy storage device 5 supplied from the capacitor sensor 16, using a data table shown in FIG. 7 which represents the relationship between internal resistances and temperatures of the electric energy storage device 5. The electric energy storage device controller 10 then calculates an energy consumption (=internal resistance·Ib$^2$) caused by the internal resistance from the determined internal resistance and the charging and discharging current Ib, and corrects the charged and discharged electric energy (Ib·Vb) depending on the energy consumption for thereby determining an actual amount of charged and discharged electric energy of the electric energy storage device 5, i.e., an amount of electric energy actually stored in the electric energy storage device 5 or an amount of electric energy actually consumed by the electric energy storage device 5.

Specifically, when the electric energy storage device 5 is charged, the quotient obtained by subtracting the energy consumption caused by the internal resistance from the charged and discharged electric energy (Ib·Vb) is determined as the actual amount of electric energy charged in the electric energy storage device 5. When electric energy storage device 5 is discharged, the sum of the energy consumption caused by the internal resistance and the charged and discharged electric energy (Ib·Vb) is determined as the actual amount of electric energy discharged from the electric energy storage device 5. It is assumed that the electric energy discharged from the electric energy storage device 5 is positive, and the electric energy charged in the electric energy storage device 5 is negative.

The electric energy storage device controller 10 integrates (accumulates) a value produced by multiplying the determined charged and discharged electric energy by the periodic time of the control cycles, which value corresponds to the amount of electric energy charged in or discharged from the electric energy storage device 5 in each control cycle, from the fully charged state of the electric energy storage device 5 in each control cycle, for thereby determining a total amount of charged and discharged electric energy of the electric energy storage device 5 from the fully charged state thereof, which total amount is equal to the quotient produced by subtracting the total amount of electric energy charged in the electric energy storage device 5 from the total amount of electric energy discharged from the electric energy storage device 5.

The electric energy storage device controller 10 then subtracts the determined total amount of charged and discharged electric energy from a full amount of electric energy that can be discharged from the electric energy storage device 5 in its fully charged state, which full amount represents the capacity of the electric energy storage device 5 in its fully charged state, for thereby grasping the amount of electric energy stored in the electric energy storage device 5, i.e., the remaining capacity thereof.

The electric energy storage device controller 10 may grasp the amount of electric energy stored in the electric energy storage device 5 according to any of various other methods. For example, the electric energy storage device controller 10 may grasp the amount of electric energy stored in the electric energy storage device 5 based on a voltage which is obtained by correcting the voltage Vb across the electric energy storage device 5 as detected by the capacitor sensor 16 with a voltage change developed by the internal resistance at the temperature Tb of the electric energy storage device 5.

Figure 8:
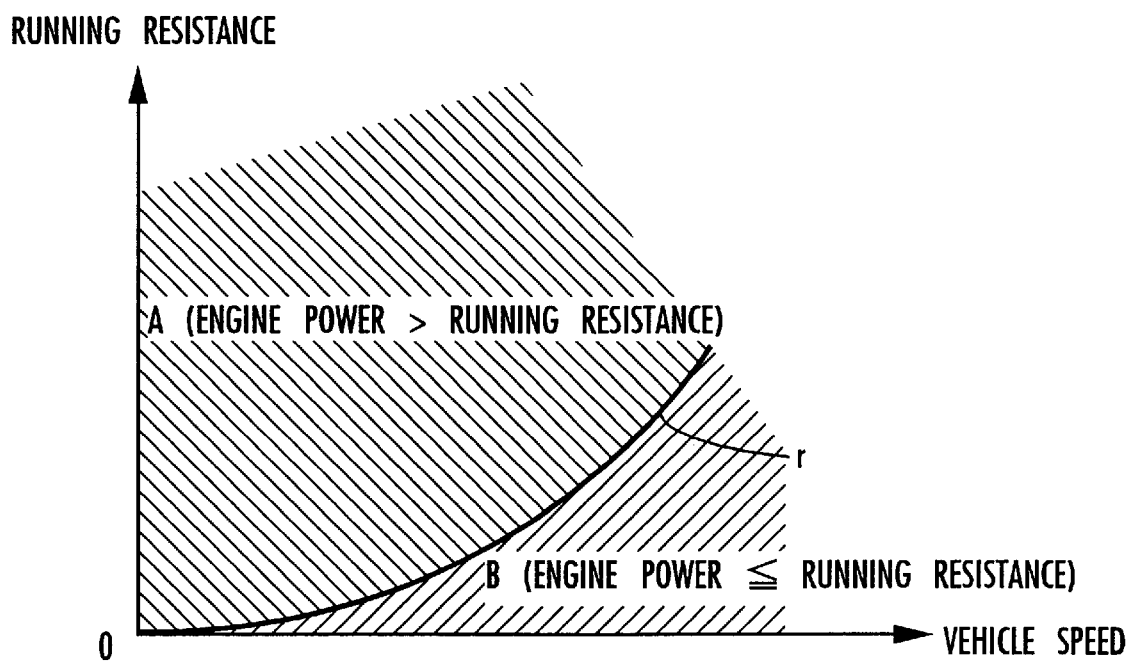
FIG. 8 is a data table showing the relationship between running resistances and vehicle speeds.

Referring back to FIG. 2, the general management controller 11 determines a running resistance of the vehicle at the present vehicle speed Vcar from the detected data of the vehicle speed Vcar supplied from the sensor 19 using a data table shown in FIG. 8 which represents the relationship between running resistances and vehicle speeds as indicated by the solid-line curve r in STEP2-2. The running resistance corresponds to a vehicle propulsion power necessary to propel the hybrid vehicle while keeping the detected vehicle speed Vcar.

The general management controller 11 determines a basic value of the throttle valve opening θth (hereinafter referred to as a "basic throttle valve opening θth0") of the internal combustion engine 1 from the detected data of the accelerator operation quantity Ap supplied from the sensor 20, using a predetermined data table (not shown) in STEP2-3. The basic throttle valve opening θth0 is basically proportional to the accelerator operation quantity Ap.

Then, the general management controller 11 determines an output generated by the internal combustion engine 1 (hereinafter referred to as "engine power") when the internal combustion engine 1 operates with the basic throttle valve opening θth0 and the detected data of the rotational speed NE, from the basic throttle valve opening θth0 and the detected data of the rotational speed NE which is supplied from the engine sensor 12 via the engine controller 7, using a predetermined map, in STEP2-4. When the basic throttle valve opening θth0 is θth0≈0, i.e., when the accelerator operation quantity Ap is sufficiently small, the engine power is "0".

The general management controller 11 determines a required total target propulsive output of the hybrid vehicle from the basic throttle valve opening θth0 and the detected data of the rotational speed NE, using a predetermined map, in STEP2-5. When the hybrid vehicle is to run with only the output of the internal combustion engine 1, the target propulsive output corresponds to a target output of the internal combustion engine 1. When the hybrid vehicle is to run with the sum of the output of the internal combustion engine 1 and the assistive output from the generator/motor 2 in the assistive operation, the target propulsive output corresponds to a target value of the sum of the output of the internal combustion engine 1 and the assistive output from the generator/motor 2.

When the basic throttle valve opening θth0 is θth0≈0, i.e., when the accelerator operation quantity Ap is sufficiently small, the target propulsive output is also "0". The accelerator operation quantity Ap, rather than the basic throttle valve opening θth0, may be used to determine the target propulsive output.

Then, the general management controller 11 calculates a corrective quantity Δθth1 for the basic throttle valve opening θth0 which is required to cause the internal combustion engine 1 to generate the target propulsive output in STEP2-6. The corrective quantity Δθth1 serves to correct the basic throttle valve opening θth0 by being added to the basic throttle valve opening θth0. The corrective quantity Δθth1 is given as the difference between the throttle opening θth of the internal combustion engine 1 (which can be determined from the map used in STEP2-4) which equalizes the engine power to the target propulsive output determined in STEP2-5, and the basic throttle valve opening θth0 determined in STEP2-3.

The general management controller 11 decides whether the engine power determined in STEP2-4 is "0" or not in STEP2-7. If the engine power is "0", i.e., if the accelerator pedal is not pressed, then the general management controller 11 determines that the required operating state of the hybrid vehicle is a decelerating regenerative mode in which the hybrid vehicle is decelerated with the generator motor 2 in the regenerative operation, and performs the control process of the decelerating regenerative mode in STEP2-8.

Figure 3:
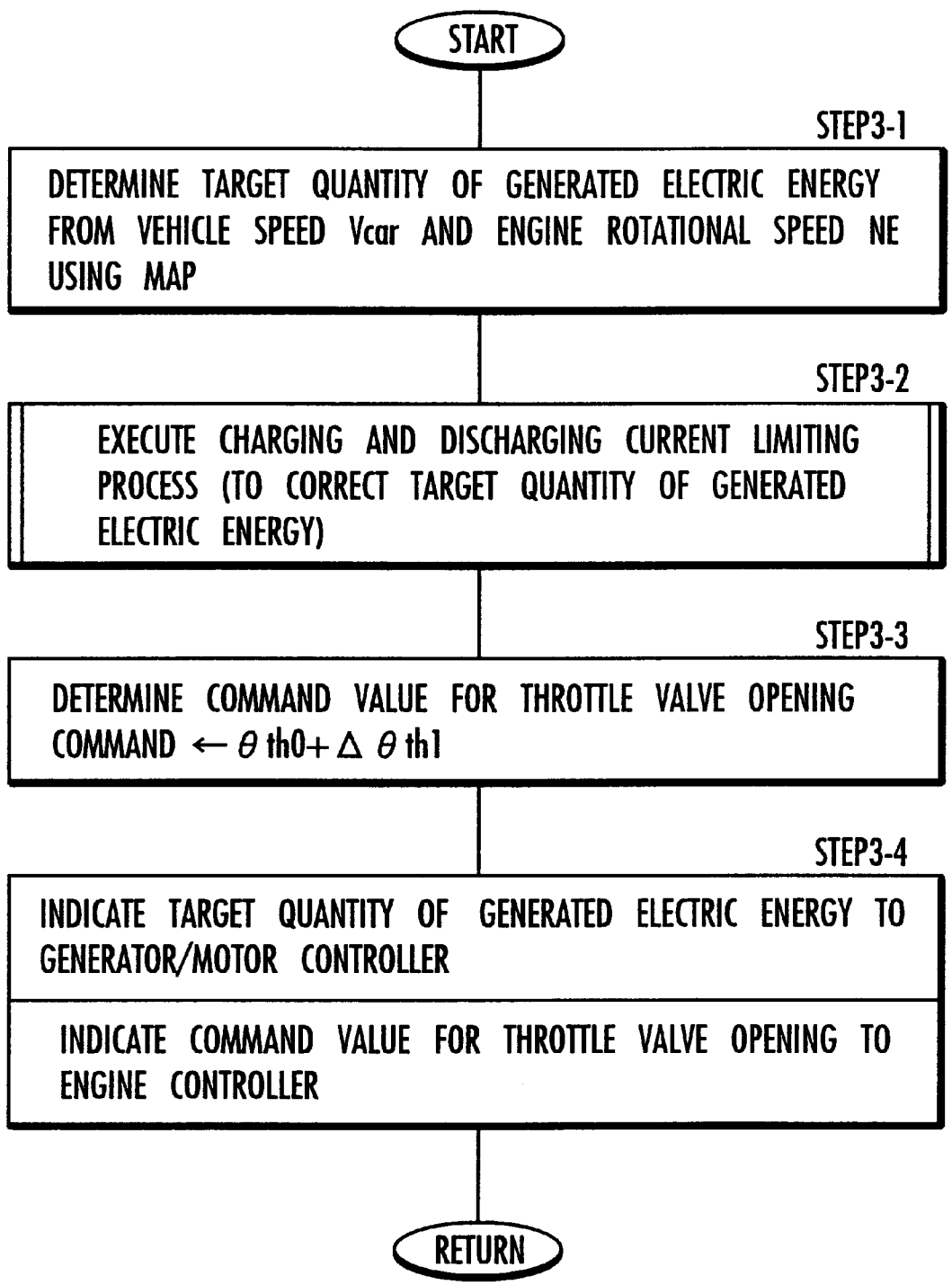
FIG. 3 is a flowchart of a control process of an decelerating regenerative mode in the processing sequence shown in FIG. 2.

The control process of the decelerating regenerative mode will be described below with reference to FIG. 3.

The general management controller 11 determines a target quantity of generated electric energy of the generator motor 2 in the regenerative operation from the detected data of the vehicle speed Vcar and the rotational speed NE (which is equal to the rotational speed of the rotor of the generator/motor 2 in the illustrated embodiment), using a predetermined map, in STEP3-1. The target quantity of generated electric energy is basically established such that it is greater as the vehicle speed Vcar and the rotational speed NE are higher. The target quantity of generated electric energy in the decelerating regenerative mode may be determined also in view of a braking action of the hybrid vehicle, the amount of electric energy stored in the electric energy storage device 5, etc., in addition to the vehicle speed Vcar and the rotational speed NE. For example, when the hybrid vehicle is braked, the target quantity of generated electric energy in the decelerating regenerative mode may be greater than when the hybrid vehicle is not braked, or when the amount of electric energy stored in the electric energy storage device 5 is smaller, the target quantity of generated electric energy in the decelerating regenerative mode may be greater.

Then, in STEP3-2, the general management controller 11 performs a control process for limiting the charging and discharging current Ib of the electric energy storage device 5 (hereinafter referred to as a "charging and discharging current limiting process", which will be described in detail later on) to correct the target quantity of generated electric energy determined in STEP3-1. Thereafter, the general management controller 11 determines a command value for the throttle valve opening θth of the internal combustion engine 1 in STEP3-3. The command value for the throttle valve opening θth is determined as the sum of the basic throttle valve opening θth0 determined in STEP2-3 and the corrective quantity Δθth1 determined in STEP2-6 (=θth0+Δθth1). The command value for the throttle valve opening θth in the decelerating regenerative mode is basically "0".

After having determined the target quantity of generated electric energy and the command value for the throttle valve opening θth, the general management controller 11 indicates the target quantity of generated electric energy and the command value for the throttle valve opening θth respectively to the generator/motor controller 8 and the engine controller 7 in STEP3-4.

In response to the indicated command value for the throttle valve opening θth, the generator/motor controller 8 controls the engine actuating device 13 to close the throttle valve, stop supplying the fuel to the internal combustion engine 1, and stop igniting the air-fuel mixture, so that the output shaft of the internal combustion engine 1 and the rotor of the generator/motor 2 coupled thereto will be rotated by the kinetic energy of the hybrid vehicle which is transmitted from the drive wheels 6.

In response to the indicated target quantity of generated electric energy, the generator/motor controller 8 controls the supply of electric energy from the generator/motor 2 to the electric energy storage device 5 with the PDU 14 in order to equalize the amount of electric energy generated by the generator/motor 2 as grasped from the detected data of the current Igm and the voltage Vgm of the armature coil supplied from the generator/motor sensor 15, to the indicated target quantity of generated electric energy. The generator/motor 2 performs the regenerative operation, and supplies the regenerated electric energy to charge the electric energy storage device 5.

Referring back to FIG. 2, if the engine power ≠0 (the engine power>0) in STEP2-7, i.e., if the accelerator pedal is pressed, then the general management controller 11 decides whether the engine power is greater than the running resistance determined in STEP2-2 in STEP2-9. If the engine power is greater than the running resistance, i.e., if the engine power is in a region A in FIG. 8, then the general management controller 11 determines that the required operating state of the hybrid vehicle is an assistive running mode in which the hybrid vehicle is accelerated with the generator motor 2 in the assistive operation, and performs the control process of the assistive running mode in STEP2-10.

Figure 4:
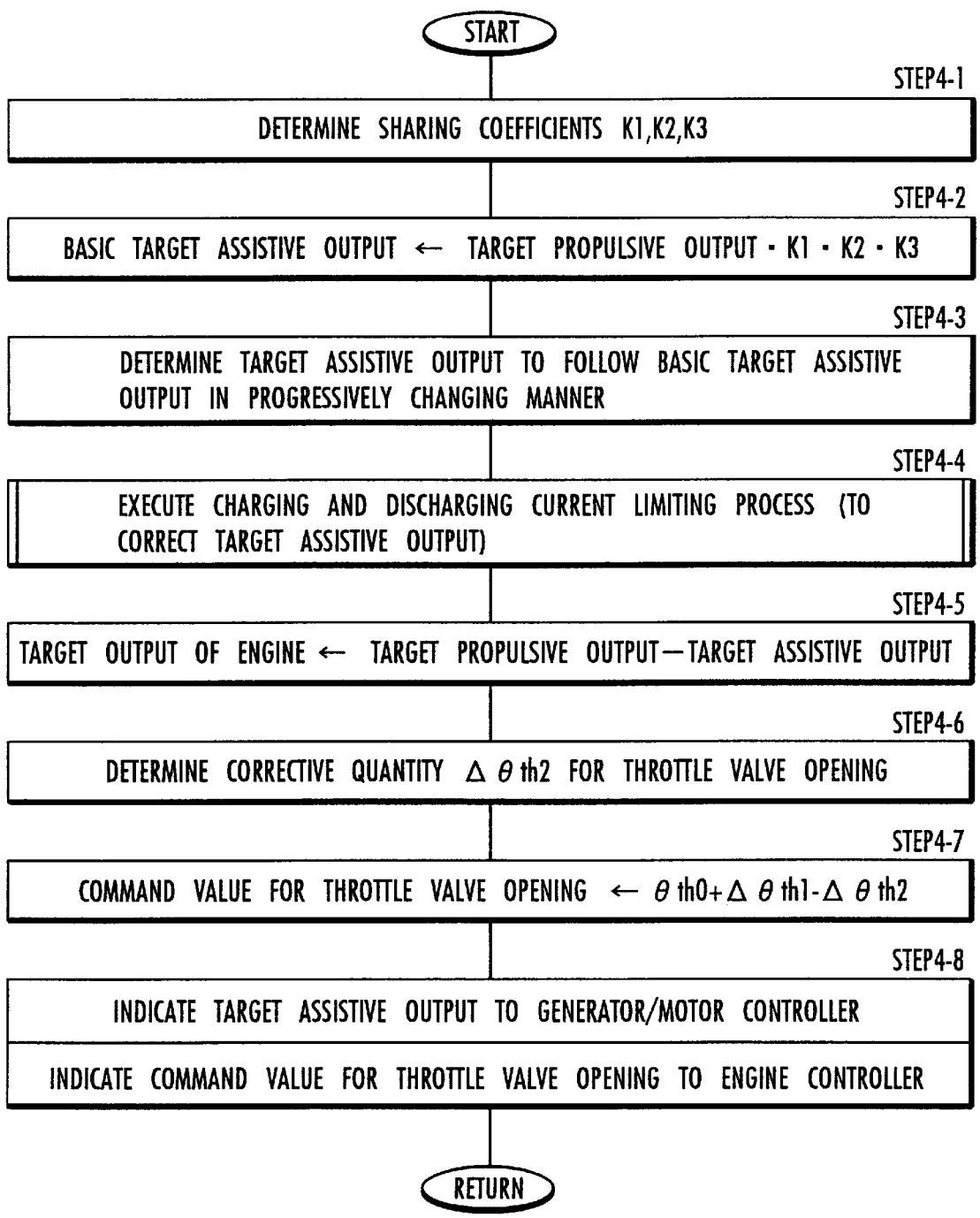
FIG. 4 is a flowchart of a control process of an assistive running mode in the processing sequence shown in FIG. 2.

The control process of the assistive running mode will be described below with reference to FIG. 4.

The general management controller 11 determines three coefficients K1, K2, K3 defining proportions of the target propulsive output determined in STEP2-5 which are to be shared by the assistive operation of the generator/motor 2 (hereinafter referred to as "sharing coefficients K1, K2, K3") in STEP4-1. The sharing coefficients K1, K2, K3 serve to determine respective shares in the target propulsive output of the generator/motor 2 by multiplying the target propulsive output. The sharing coefficient K1 is a coefficient determined from the amount of electric energy stored in the electric energy storage device 5 acquired in STEP2-1, using a predetermined data table. The sharing coefficient K2 is a coefficient determined from the basic throttle valve opening θth0 determined in STEP2-3, using a predetermined data table. The sharing coefficient K3 is a coefficient determined from a marginal output of the engine power with respect to the running resistance (which is obtained by subtracting the running resistance determined in STEP2-2 from the engine power determined in STEP2-4) and the vehicle speed Vcar, using a predetermined map.

The sharing coefficient K1 is basically determined such that as the amount of electric energy stored in the electric energy storage device 5 is larger, the output (assistive output) to be shared by the assistive operation of the generator/motor 2 is greater. The sharing coefficient K2 is basically determined such that when the basic throttle valve opening θth0 is of a value close to the full opening of the throttle valve, the output of the generator/motor 2 is greater. The sharing coefficient K3 is basically determined such that as the marginal output described above is greater, the output of the generator/motor 2 is greater, and as the vehicle speed Vcar is lower, the output of the generator/motor 2 is greater.

Then, the general management controller 11 determines a basic target assistive output for the generator/motor 2 to be shared in the target propulsive output by the assistive operation of the generator/motor 2 by multiplying the target propulsive output by the sharing coefficients K1, K2, K3 in STEP4-2.

Figure 9:
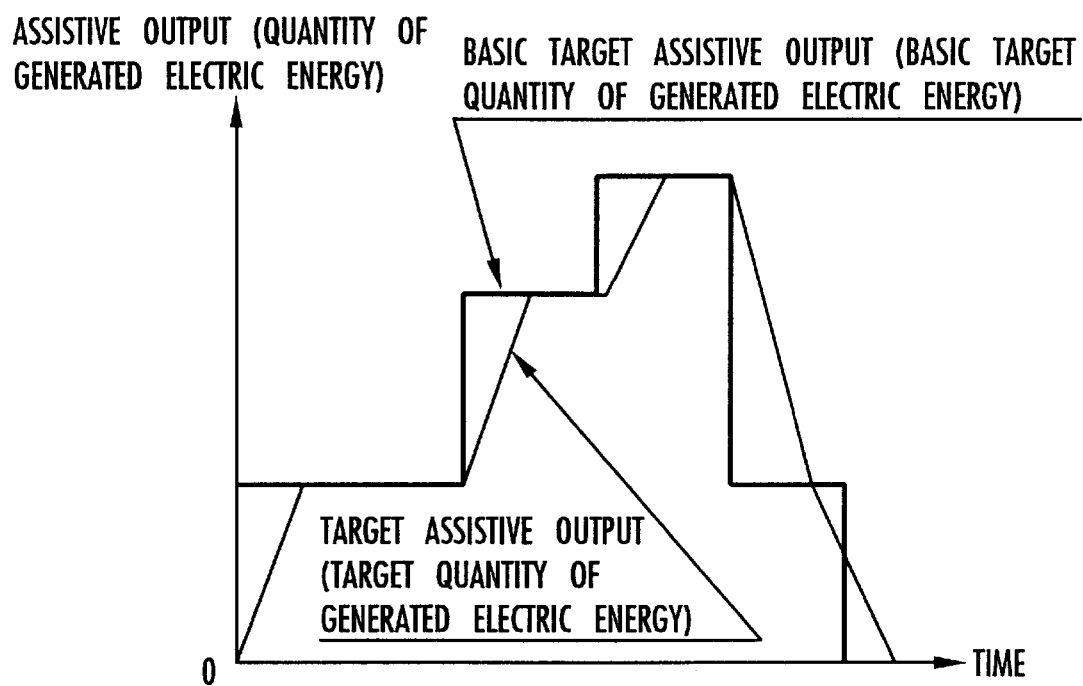
FIG. 9 is a diagram showing the manner in which a target assistive output of a generator/motor follows a basic target assistive output in a progressively changing fashion.

Thereafter, the general management controller 11 determines a target assistive output of the generator/motor 2 to be finally indicated to the generator/motor controller 8 so as to follow the basic target assistive output in a progressively changing manner in STEP4-3, as illustrated in FIG. 9. Specifically, as shown in FIG. 9, the target assistive output of the generator/motor 2 is determined such that when the basic target assistive output determined in STEP4-2 in each control cycle changes, the target assistive output of the generator/motor 2 follows the changed basic target assistive output with the response delay of a certain time constant. The terms in parentheses shown in FIG. 9 are related to the control process of a cruising regenerative mode described later on.

Then, the general management controller 11 executes a charging and discharging current limiting process (described later on), which is the same as in the decelerating regenerative mode, to correct the target assistive output determined in STEP4-3 in STEP4-4. Thereafter, the general management controller 11 subtracts the target assistive output of the generator/motor 2 from the target propulsive output determined in STEP2-5 for thereby determining a target output of the internal combustion engine 1 in STEP4-5.

The general management controller 11 determines a corrective quantity Δθth2 for the throttle valve opening θth which is required to cause the internal combustion engine 1 to generate the target output in STEP4-6. The corrective quantity Δθth2 serves to correct the throttle valve opening θth by being subtracted from the throttle valve opening θth (=θth0+Δθth1) (see STEP2-6) required for the internal combustion engine 1 to generate the target propulsive output. The corrective quantity Δθth2 is given as the difference between the throttle opening θth of the internal combustion engine 1 (which can be determined from the map used in STEP2-4) which equalizes the engine power to the target output determined in STEP4-5, and the throttle valve opening θth (=θth0+Δθth1) corresponding to the target propulsive output.

The general management controller 11 determines a command value (=θth0+Δθth1−Δθth2) for the throttle valve opening θth of the internal combustion engine 1 by subtracting the corrective quantity Δθth2 determined in STEP4-6 from the throttle valve opening θth (=θth0+Δθth1) corresponding to the target propulsive output, in STEP4-7.

After having determined the target assistive output of the generator/motor 2 and the command value for the throttle valve opening θth, the general management controller 11 indicates the target assistive output and the command value for the throttle valve opening θth respectively to the generator/motor controller 8 and the engine controller 7 in STEP4-8.

The engine controller 7 controls the engine actuating device 13 to actuate the throttle valve of the internal combustion engine 1 according to the indicated command value for the throttle valve opening θth, while referring to the detected data from the engine sensor 12, and also to control the amount of the fuel supplied to the internal combustion engine 1 and the ignition timing of the internal combustion engine 1.

The generator/motor controller 8 supplies electric energy from the electric energy storage device 5 to the generator/motor 2 via the PDU 14 for thereby causing the generator/motor 2 to perform the assistive operation. The amount of electric energy supplied from the electric energy storage device 5 to the generator/motor 2 is controlled by the PDU 14 such that the assistive output generated by the generator/motor 2 will be equalized to the indicated target assistive output.

The internal combustion engine 1 and the generator/motor 2 now generate the target output and the target assistive output, respectively, and the sum of these outputs, i.e., the target propulsive output, is transmitted via the transmission 3 to the drive wheels 6 for accelerating the hybrid vehicle.

The actual output of the internal combustion engine 1 generally suffers a response delay with respect to the command value for the throttle valve opening θth. Since, however, the target assistive output of the generator/motor 2 which corresponds to the throttle valve opening θth follows the basic target assistive output with the response delay of a certain time constant, the actual assistive output of the generator/motor 2 and the actual output of the internal combustion engine 1 can be timed to each other.

Referring back to FIG. 2, if the engine power is equal to or smaller than the running resistance in STEP2-9, i.e., if the engine power is in a region B in FIG. 8, then the general management controller 11 determines that the required operating state of the hybrid vehicle is a cruising regenerative mode in which the hybrid vehicle is cruising (running at a substantially constant speed) with the generator motor 2 in the regenerative operation using a portion of the output of the internal combustion engine 1, and performs the control process of the cruising regenerative mode in STEP2-11.

Figure 5:
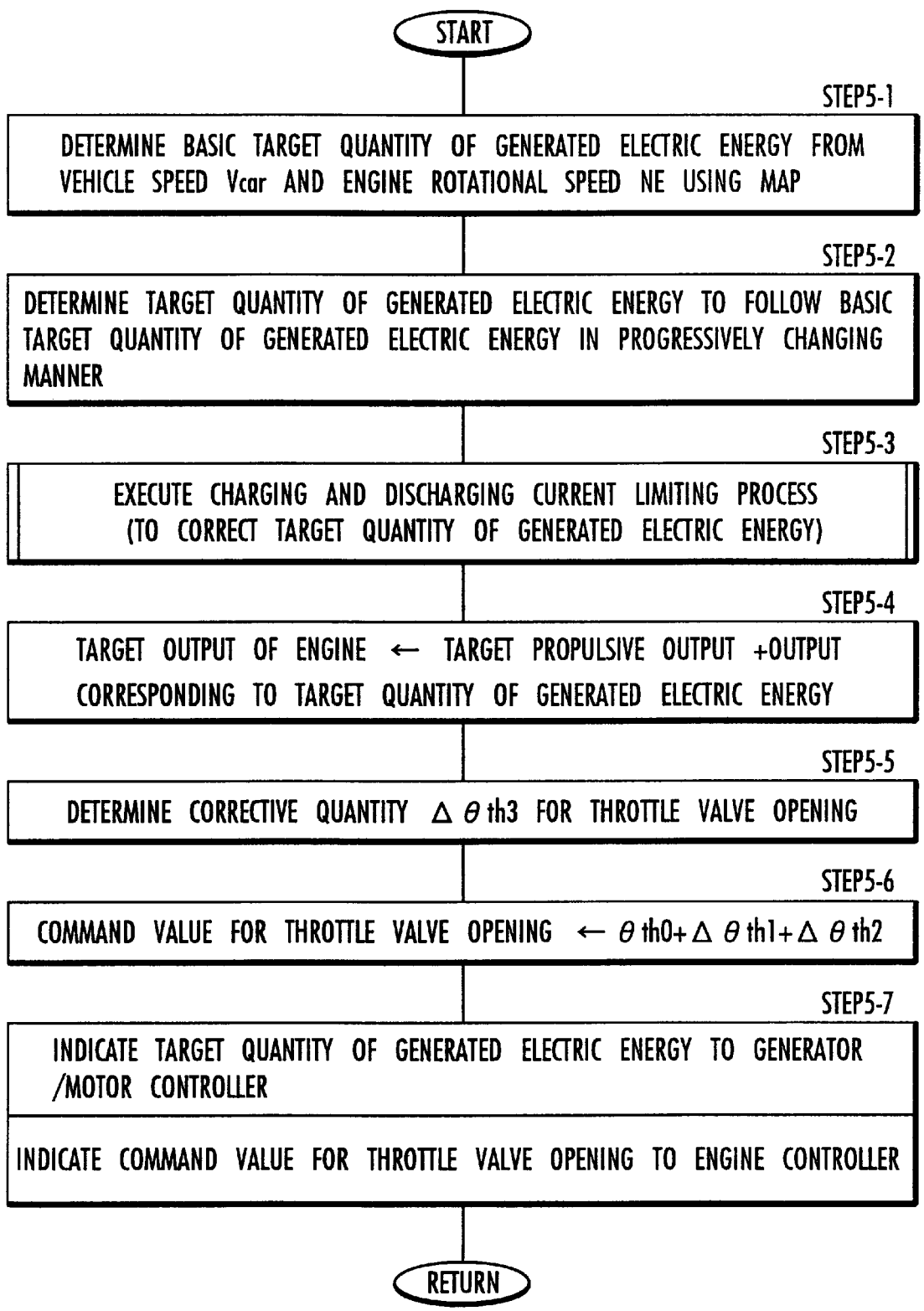
FIG. 5 is a flowchart of a control process of a cruising regenerative mode in the processing sequence shown in FIG. 2.

The control process of the cruising regenerative mode will be described below with reference to FIG. 5.

The general management controller 11 determines a basic target quantity of generated electric energy of the generator motor 2 in the regenerative operation from the detected data of the vehicle speed Vcar and the rotational speed NE, using a predetermined map, in STEP5-1. The determined basic target quantity of generated electric energy is sufficiently smaller than the target quantity of generated electric energy determined in the decelerating regenerative mode (see STEP3-1). The basic target quantity of generated electric energy may be determined also in view of the amount of electric energy stored in the electric energy storage device 5, etc., in addition to the vehicle speed Vcar and the rotational speed NE. For example, the basic target quantity of generated electric energy may be greater as the amount of electric energy stored in the electric energy storage device 5 is smaller.

Then, as in the assistive running mode, the general management controller 11 determines a target quantity of generated electric energy of the generator/motor 2 to be finally indicated to the generator/motor controller 8 so as to follow the basic target quantity of generated electric energy in a progressively changing manner in STEP5-2 (see FIG. 9).

Then, the general management controller 11 executes a charging and discharging current limiting process (described later on), which is the same as in the decelerating regenerative mode, to correct the target quantity of generated electric energy determined in STEP5-2 in STEP5-3. Thereafter, the general management controller 11 adds the output of the internal combustion engine 1 which corresponds to the target quantity of generated electric energy of the generator/motor 2 to the target propulsive output determined in STEP2-5 for thereby determining a target output of the internal combustion engine 1 in STEP5-4.

The general management controller 11 determines a corrective quantity $\Delta\theta th3$ for the throttle valve opening $\theta th$ which is required to cause the internal combustion engine 1 to generate the target output in STEP5-5. The corrective quantity $\Delta\theta th3$ serves to correct the throttle valve opening $\theta th$ by being added to the throttle valve opening $\theta th$ (=$\theta th0+\Delta\theta th1$) (see STEP2-6) required for the internal combustion engine 1 to generate the target propulsive output. The corrective quantity $\Delta\theta th2$ is given as the difference between the throttle opening $\theta th$ of the internal combustion engine 1 (which can be determined from the map used in STEP2-4) which equalizes the engine power to the target output determined in STEP5-4, and the throttle valve opening $\theta th$ (=$\theta th0+\Delta\theta th1$) corresponding to the target propulsive output.

The general management controller 11 determines a command value (=$\theta th0+\Delta\theta th1+\Delta\theta th3$) for the throttle valve opening $\theta th$ of the internal combustion engine 1 by adding the corrective quantity $\Delta\theta th3$ determined in STEP5-5 to the throttle valve opening $\theta th$ (=$\theta th0+\Delta\theta th1$) corresponding to the target propulsive output, in STEP5-6.

After having determined the target quantity of generated electric energy of the generator/motor 2 and the command value for the throttle valve opening $\theta th$, the general management controller 11 indicates the target quantity of generated electric energy and the command value for the throttle valve opening $\theta th$ respectively to the generator/motor controller 8 and the engine controller 7 in STEP5-7.

The engine controller 7 controls the engine actuating device 13 to actuate the throttle valve of the internal combustion engine 1 according to the indicated command value for the throttle valve opening $\theta th$, and also to control the amount of the fuel supplied to the internal combustion engine 1 and the ignition timing of the internal combustion engine 1, as in the assistive running mode.

The generator/motor controller 8 controls the supply of electric energy from the generator/motor 2 to the electric energy storage device 5 with the PDU 14 for thereby causing the generator/motor 2 to generate the indicated target quantity of generated electric energy, as in the decelerating regenerative mode. Of the output of the internal combustion engine 1, the portion which corresponds to the amount of electric energy generated by the generator/motor 2 is used as an energy source for the regenerative operation of the generator/motor 2, and the remaining output (=the target propulsive output) is transmitted via the transmission 3 to the drive wheels 6.

Since the target quantity of generated electric energy of the generator/motor 2 which corresponds to the throttle valve opening $\theta th$ follows the basic target quantity of generated electric energy with the response delay of a certain time constant, the actual quantity of electric energy generated by the generator/motor 2 and the actual output of the internal combustion engine 1 can be timed to each other.

While the hybrid vehicle is running in each of the decelerating regenerative mode, the assistive running mode, and the cruising regenerative mode, the transmission controller 9 controls the actuator 17 to make a gear shift in the transmission 3 based on the shifted position SP of the gear shift lever as detected by the transmission sensor 18. While the hybrid vehicle is running, the clutch 4 is held in the engaged state.

Figure 6:
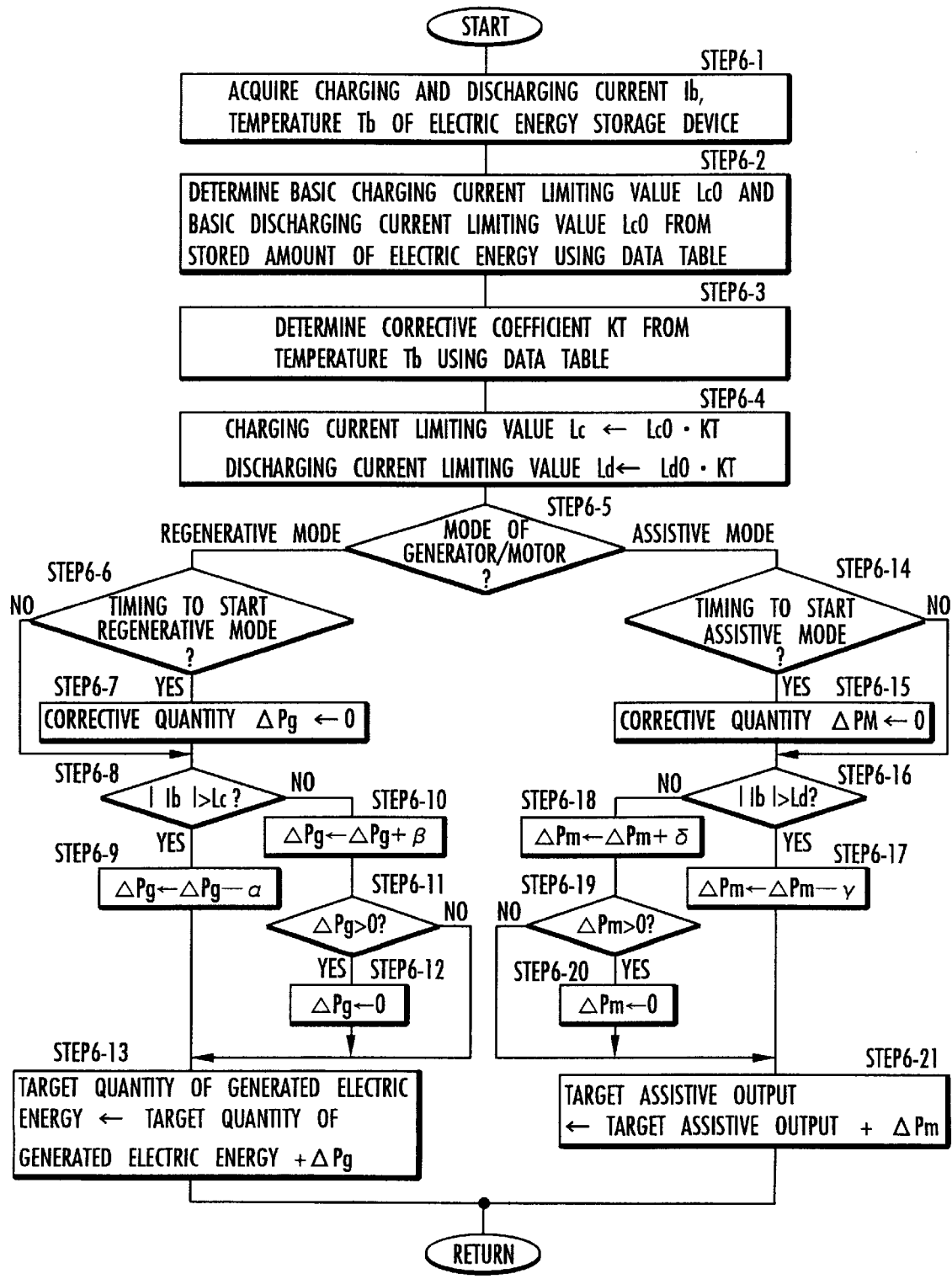
FIG. 6 is a flowchart of a process of limiting a charging and discharging current in the control processes shown in FIGS. 3, 4, and 5.

The charging and discharging current limiting process in each of STEP3-2, STEP4-4, STEP5-3 in each of the above modes is carried out according to a process shown in FIG. 6. In each of the above modes, the target quantity of generated electric energy or the target assistive output of the generator/motor 2 is determined according to the charging and discharging current limiting process.

The charging and discharging current limiting process will be described below with reference to FIG. 6.

The general management controller 11 acquires the detected data of the charging and discharging current Ib and the temperature Tb of the electric energy storage device 5 from the electric energy storage device controller 10 in STEP6-1.

Figure 10:
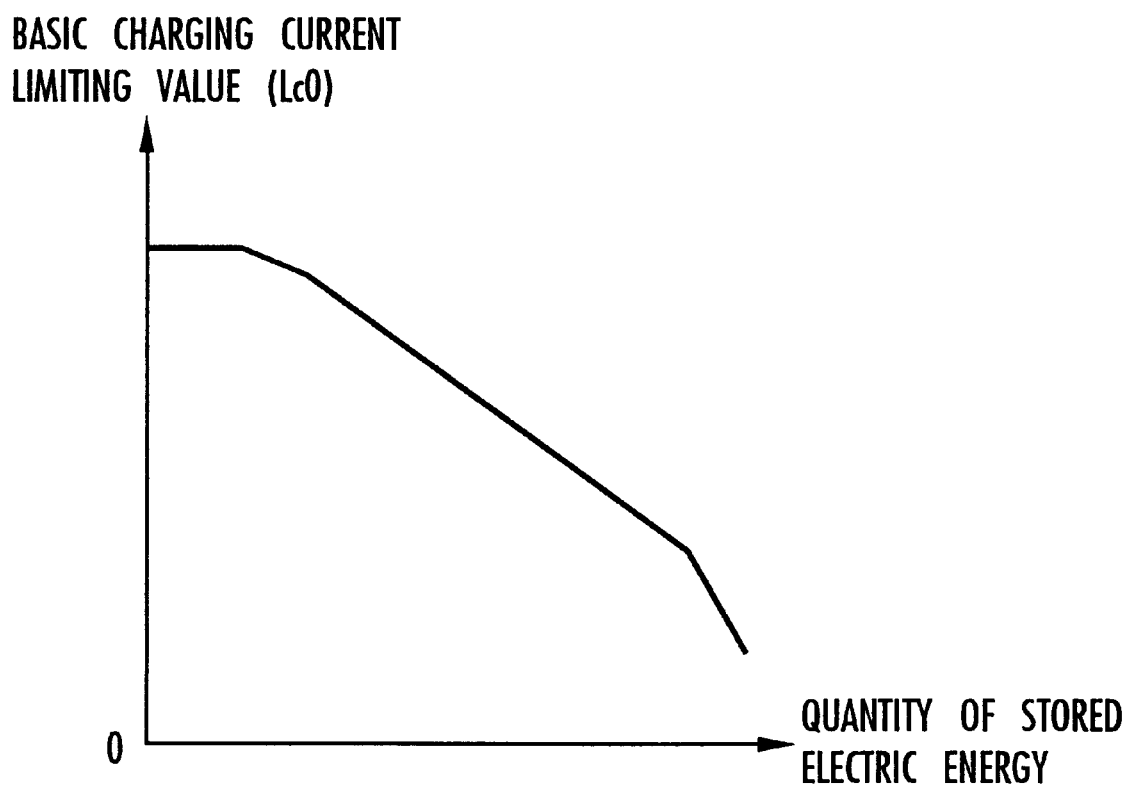
FIG. 10 is a diagram showing the relationship between basic charging current limiting values and quantities of stored electric energy.
Figure 11:
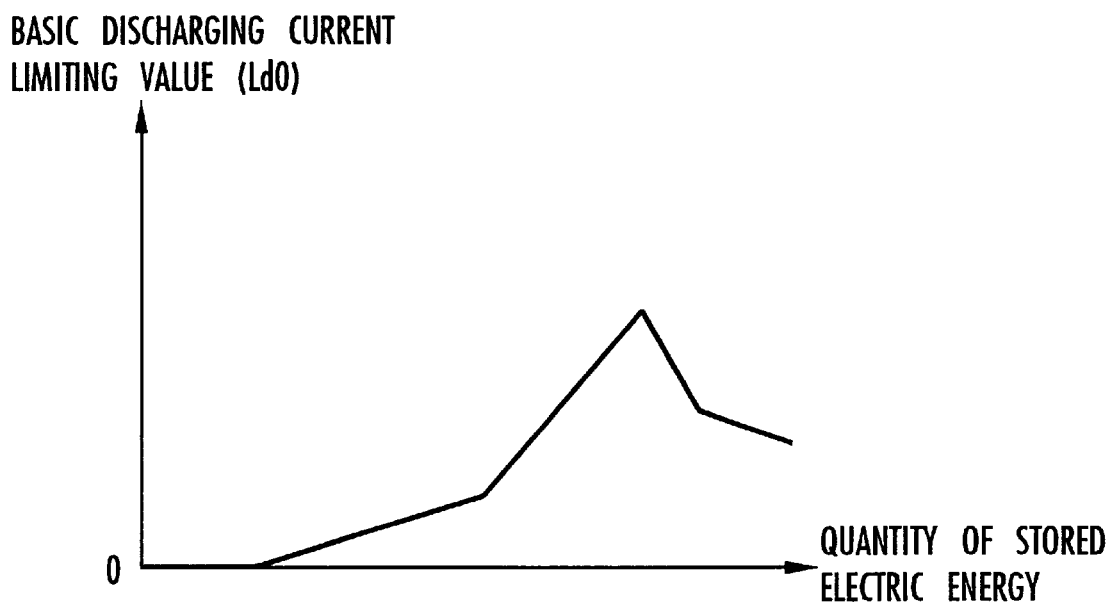
FIG. 11 is a diagram showing the relationship between basic discharging current limiting values and quantities of stored electric energy.

Then, the general management controller 11 determines basic limiting values (basic upper limit values) Lc0, Ld0 of the charging current Ibc and the discharging current Ibd of the electric energy storage device 5 from the detected data of amount of electric energy stored in the electric energy storage device 5, which has been acquired in STEP2-1, using data tables shown in FIGS. 10 and 11, in STEP6-2. FIG. 10 show the relationship between basic charging current limiting values Lc0 and quantities of stored electric energy, and FIG. 11 show the relationship between basic discharging current limiting values Ld0 and quantities of stored electric energy.

The basic limiting value Lc0 relative to the charging current Ibc (hereinafter referred to as a "basic charging current limiting value Lc0") of the electric energy storage device 5 is determined such that when the charging current Ibc of the basic charging current limiting value Lc0 is passed through the electric energy storage device 5 which has a reference internal resistance at 20° (normal temperature), the voltage Vb across the electric energy storage device 5 does not exceeds a breakdown voltage thereof. Since the voltage Vb across the electric energy storage device 5 is higher as the amount of electric energy stored therein is greater and tends to increase when the charging current Ibc is passed through the electric energy storage device 5, the basic charging current limiting value Lc0 is basically smaller as the amount of electric energy stored therein is greater.

The basic limiting value Ld0 relative to the discharging current Ibc (hereinafter referred to as a "basic discharging current limiting value Ld0") of the electric energy storage device 5 is determined such that when the discharging current Ibc of the basic discharging current limiting value Ld0 is passed through the electric energy storage device 5 which has the reference internal resistance at the normal temperature, the voltage Vb across the electric energy storage device 5 does not fall below a voltage which is capable of the assistive operation of the generator/motor 2. Since the voltage Vb across the electric energy storage device 5 is lower as the amount of electric energy stored therein is smaller and tends to drop when the discharging current Ibd is passed through the electric energy storage device 5, the basic discharging current limiting value Ld0 is basically smaller as the amount of electric energy stored therein is smaller. In the illustrated embodiment, however, if the amount of electric energy stored in the electric energy storage device 5 is greater than a certain level, then in order to keep a substantially constant upper limit for the electric energy discharged from the electric energy storage device 5, the basic discharging current limiting value Ld0 is smaller as the amount of electric energy stored therein is greater, as shown in FIG. 11.

Figure 12:
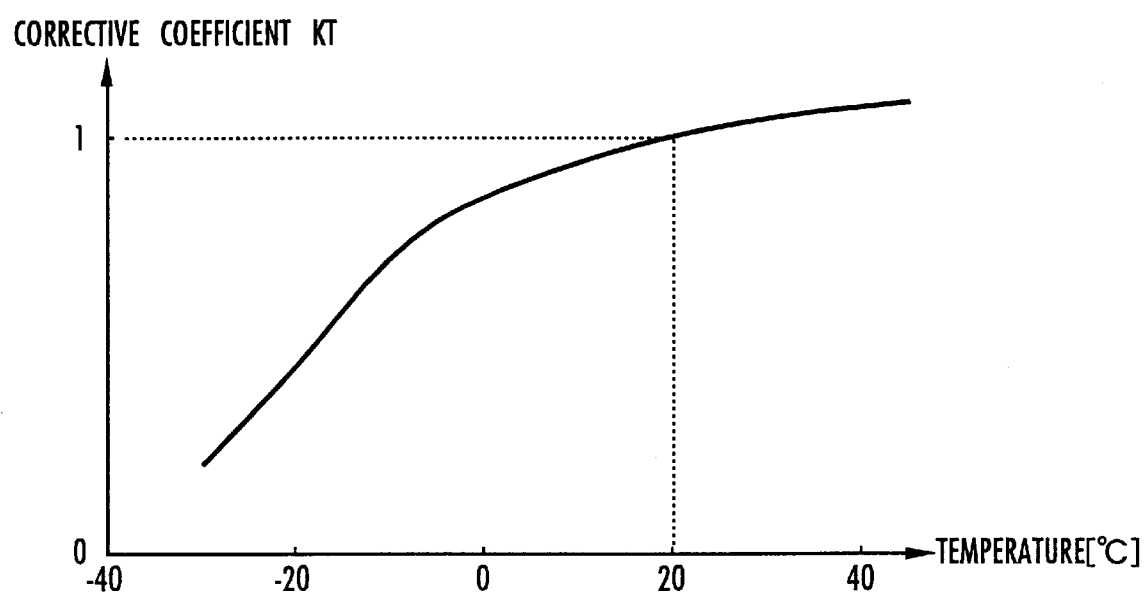
FIG. 12 is a data table showing the relationship between corrective coefficients and temperatures.

In view of changes in the internal resistance of the electric energy storage device 5 depending on the temperature Tb thereof, the general management controller 11 determines a corrective coefficient KT for correcting the basic charging and discharging current limiting values Lc0, Ld0 from the detected data of the temperature Tb acquired in STEP6-1, using a data table shown in FIG. 12, in STEP6-3.

The corrective coefficient KT serves to correct the basic charging and discharging current limiting values Lc0, Ld0 by multiplying them. The corrective coefficient KT at the normal temperature (20° C.) which is a reference temperature for the basic charging and discharging current limiting values Lc0, Ld0 is "1". In view of the fact that the internal resistance of the electric energy storage device 5 changes depending on the temperature Tb thereof (the internal resistance increases as the temperature Tb decreases), as shown in FIG. 7, the value of the corrective coefficient KT is smaller as the temperature Tb is lower. The corrective coefficient KT may be established independently with respect to each of the basic charging and discharging current limiting values Lc0, Ld0.

After having determined the corrective coefficient KT, the general management controller 11 multiplies each of the basic charging and discharging current limiting values Lc0, Ld0 by the corrective coefficient KT for thereby finally determining actual limiting values Lc, Ld for the charging current Ibc and the discharging current Ibd of the electric energy storage device 5 (hereinafter referred to as a "charging current limiting value Lc" and a "discharging current limiting value Ld", respectively) in STEP6-4. The charging current limiting value Lc and the discharging current limiting value Ld thus determined depend on the amount of electric energy stored in the electric energy storage device 5 and the temperature Tb thereof.

The charging current limiting value Lc and the discharging current limiting value Ld may alternatively be determined directly from the amount of electric energy stored in the electric energy storage device 5 and the temperature Tb thereof, using a map.

Then, the general management controller 11 decides whether the operating state of the generator/motor 2 is the assistive operation (assistive running mode) or the regenerative operation (decelerating regenerative mode or cruising regenerative mode) in STEP6-5.

If the operating state of the generator/motor 2 is the regenerative operation, then the general management controller 11 decides whether the timing to start the regenerative operation is reached or not by comparing the operating state of the generator/motor 2 with the operating state of the generator/motor 2 in the preceding control cycle in STEP6-6. If the timing to start the regenerative operation is reached, then the general management controller 11 resets a corrective quantity ΔPg for correcting the target quantity of generated electric energy of the generator/motor 2 determined in STEP3-1 or STEP5-2 to "0" in STEP6-7, and control goes to STEP6-8. If the timing to start the regenerative operation is not reached, i.e., if the regenerative operation is being continued, then control jumps to STEP6-8.

In STEP6-8, the general management controller 11 compares the magnitude (absolute value) of the charging and discharging current Ib (in this case, the charging current Ibc) of the electric energy storage device 5 acquired in STEP6-1 with the charging current limiting value Lc determined in STEP6-4.

If the magnitude of the charging and discharging current Ib (the charging current Ibc) exceeds the charging current limiting value Lc (|Ib|>Lc), then the general management controller 11 updates the corrective quantity ΔPg to a value which is obtained by subtracting a predetermined value α from the present value of the corrective quantity ΔPg in STEP6-9. Thereafter, the general management controller 11 corrects the target quantity of generated electric energy of the generator/motor 2 into a value which is the sum of the target quantity of generated electric energy of the generator/motor 2 determined in STEP3-1 or STEP5-2 and the corrective quantity ΔPg ($\leq 0$) in STEP6-13. That is, the general management controller 11 reduces the target quantity of generated electric energy by the corrective quantity ΔPg, or more precisely, the absolute value of the corrective quantity ΔPg.

If $|Ib| \leq Lc$ in STEP6-8, then the general management controller 11 updates the corrective quantity ΔPg to a value which is obtained by adding a predetermined value β to the present value of the corrective quantity ΔPg in STEP6-10. Then, the general management controller 11 decides whether the corrective quantity ΔPg exceeds "0" or not in STEP6-11. If ΔPg>0, then the general management controller 11 resets the corrective quantity ΔPg to "0" in STEP6-12, and thereafter determines the final target quantity of generated electric energy of the generator/motor 2 in STEP6-13. The target quantity of generated electric energy determined at this time is equal to the target quantity of generated electric energy of the generator/motor 2 determined in STEP3-1 or STEP5-2.

If $\Delta Pg \leq 0$ in STEP6-11, the general management controller 11 jumps to STEP6-13 and determines the final target quantity of generated electric energy of the generator/motor 2.

Therefore, if $|Ib| \leq Lc$ after the target quantity of generated electric energy of the generator/motor 2 has been reduced, i.e., after ΔPg<0, the absolute value of the corrective quantity ΔPg is reduced by the predetermined value β in each control cycle. Finally, the correction to reduce the target quantity of generated electric energy is canceled.

The predetermined value α by which to update the corrective quantity ΔPg in STEP6-9 is selected to be greater than the predetermined value β by which to update the corrective quantity ΔPg in STEP6-10 (α>β). This is because the process of canceling the reduction of the target quantity of generated electric energy, i.e., the process of reducing the absolute value of the corrective quantity ΔPg, is to be effected slower than the process of reducing the target quantity of generated electric energy, i.e., the process of increasing the absolute value of the corrective quantity ΔPg, so that the charging and discharging current Ib (the charging current Ibc) will be kept equal to or lower than the charging current limiting value Lc as much as possible.

Upon the regenerative operation of the generator/motor 2, if the charging current Ibc exceeds the charging current limiting value Lc, then the processing of STEP6-1 through STEP6-13 is carried out in each control cycle to reduce the target quantity of generated electric energy of the generator/motor 2 determined in STEP3-1 or STEP5-2 by the predetermined value α until the charging current Ibc becomes equal to or lower than the charging current limiting value Lc. As a result, the current passing through the armature coil of the generator/motor 2 is reduced, thus reducing the charging current Ibc of the electric energy storage device 5 until it is kept equal to or below the charging current limiting value Lc. When the charging current Ibc becomes equal to or lower than the charging current limiting value Lc, the target quantity of generated electric energy of the generator/motor 2 is increased back to the target quantity of generated electric energy determined in STEP3-1 or STEP5-2 by the predetermined value β in each control cycle until the correction to reduce the target quantity of generated electric energy is canceled. While the charging current Ibc is being steadily kept equal to or below the charging current limiting value Lc, since the corrective quantity ΔPg is "0", the target quantity of generated electric energy of the generator/motor 2 is of the value determined in STEP3-1 or STEP5-2.

If the operating state of the generator/motor 2 is the assistive operation, then the general management controller 11 decides whether the timing to start the assistive operation is reached or not by comparing the operating state of the generator/motor 2 with the operating state of the generator/motor 2 in the preceding control cycle in STEP6-14. If the timing to start the assistive operation is reached, then the general management controller 11 resets a corrective quantity ΔPm for correcting the target assistive output of the generator/motor 2 determined in STEP4-4 to "0" in STEP6-15, and control goes to STEP6-16. If the timing to start the assistive operation is not reached, i.e., if the assistive operation is being continued, then control jumps to STEP6-16.

In STEP6-16, the general management controller 11 compares the magnitude (absolute value) of the charging and discharging current Ib (in this case, the discharging current Ibd) of the electric energy storage device 5 acquired in STEP6-1 with the discharging current limiting value Ld determined in STEP6-4.

If the magnitude of the charging and discharging current Ib (the discharging current Ibd) exceeds the discharging current limiting value Ld (|Ib|>Ld), then the general management controller 11 updates the corrective quantity ΔPm to a value which is obtained by subtracting a predetermined value γ from the present value of the corrective quantity ΔPm in STEP6-17. Thereafter, the general management controller 11 corrects the target assistive output of the generator/motor 2 into a value which is the sum of the target assistive output of the generator/motor 2 determined in STEP4-4 and the corrective quantity ΔPm (<0) in STEP6-21. That is, the general management controller 11 reduces the target assistive output by the corrective quantity ΔPm, or more precisely, the absolute value of the corrective quantity ΔPm.

If |Ib|≦Ld in STEP6-16, then the general management controller 11 updates the corrective quantity ΔPm to a value which is obtained by adding a predetermined value δ to the present value of the corrective quantity ΔPm in STEP6-18. Then, the general management controller 11 decides whether the corrective quantity ΔPm exceeds "0" or not in STEP6-19. If ΔPm>0, then the general management controller 11 resets the corrective quantity ΔPm to "0" in STEP6-20, and thereafter determines the final target assistive output of the generator/motor 2 in STEP6-21. The target assistive output determined at this time is equal to the target assistive output of the generator/motor 2 determined in STEP4-4.

If ΔPm≦0 in STEP6-19, the general management controller 11 jumps to STEP6-21 and determines the final target assistive output of the generator/motor 2.

Therefore, if |Ib|≦Ld after the target assistive output of the generator/motor 2 has been reduced, i.e., after ΔPm<0, the absolute value of the corrective quantity ΔPm is reduced by the predetermined value δ in each control cycle. Finally, the correction to reduce the target assistive output is canceled.

The predetermined value γ by which to update the corrective quantity ΔPm in STEP6-17 is selected to be greater than the predetermined value δ by which to update the corrective quantity ΔPm in STEP6-18 (γ>δ). This is because the process of canceling the reduction of the target assistive output, i.e., the process of reducing the absolute value of the corrective quantity ΔPm, is to be effected slower than the process of reducing the target assistive output, i.e., the process of increasing the absolute value of the corrective quantity ΔPm, so that the charging and discharging current Ib (the discharging current Ibd) will be kept equal to or lower than the discharging current limiting value Ld as much as possible.

Upon the assistive operation of the generator/motor 2, if the discharging current Ibd exceeds the discharging current limiting value Ld, then the processing of STEP6-1 through STEP6-5 and STEP6-14 through STEP6-21 is carried out in each control cycle to reduce the target assistive output of the generator/motor 2 determined in STEP4-4 by the predetermined value γ until the discharging current Ibd becomes equal to or lower than the discharging current limiting value Ld. As a result, the current passing through the armature coil of the generator/motor 2 is reduced, thus reducing the discharging current Ibd of the electric energy storage device 5 until it is kept equal to or below the discharging current limiting value Ld. When the discharging current Ibd becomes equal to or lower than the discharging current limiting value Ld, the target assistive output of the generator/motor 2 is increased back to the target assistive output determined in STEP4-4 by the predetermined value δ in each control cycle until the correction to reduce the target assistive output is canceled. While the discharging current Ibd is being steadily kept equal to or below the discharging current limiting value Ld, since the corrective quantity ΔPm is "0", the target assistive output of the generator/motor 2 is of the value determined in STEP4-4.

When the hybrid vehicle operates as described above, the charging current Ibc of the electric energy storage device 5 upon the regenerative operation of the generator/motor 2 is limited to a value equal to or lower than the charging current limiting value Lc, preventing the voltage Vb across the electric energy storage device 5 from becoming excessively higher than the breakdown voltage thereof due to the internal resistance of the electric energy storage device 5. Since the charging current limiting value Lc is established depending on the amount of electric energy stored in the electric energy storage device 5 (remaining capacity) and the temperature Tb thereof, the voltage Vb across the electric energy storage device 5 is reliably prevented from unduly exceeding the breakdown voltage thereof. As a consequence, the regenerative operation of the generator/motor 2 is continuously carried out without fail, making it possible to supply as much electric energy from the generator motor 2 as possible to charge the electric energy storage device 5.

For limiting the charging current Ibc of the electric energy storage device 5, when the magnitude of the charging current Ibc (detected value thereof) exceeds the charging current limiting value Lc, the target quantity of generated electric energy established depending on operating stages of the hybrid vehicle such as the vehicle speed Vcar is corrected so as to be reduced. Therefore, the charging current Ibc can be limited adequately. When the charging current Ibc becomes equal to or smaller than the charging current limiting value Lc by reducing the target quantity of generated electric energy, the corrective quantity $\Delta$Pg by which to reduce the target quantity of generated electric energy is reduced until the correction to reduce the target quantity of generated electric energy is canceled. Therefore, the correction to reduce the target quantity of generated electric energy is minimized.

The discharging current Ibd of the electric energy storage device 5 upon the assistive operation of the generator/motor 2 is limited to a value equal to or lower than the discharging current limiting value Ld, preventing the voltage Vb across the electric energy storage device 5 from becoming excessively lower than the breakdown voltage thereof due to the internal resistance of the electric energy storage device 5 for keeping the voltage Vb at a level capable of the assistive operation of the generator/motor 2. Since the discharging current limiting value Ld is established depending on the amount of electric energy stored in the electric energy storage device 5 (remaining capacity) and the temperature Th thereof, the voltage Vb across the electric energy storage device 5 is reliably prevented from becoming unduly lower than the breakdown voltage thereof. As a consequence, the assistive operation of the generator/motor 2 is continuously carried out without fail, using as much electric energy from the generator motor 2 as possible, and the fuel consumption by the internal combustion engine 1 is held to a minimum.

For limiting the discharging current Ibd of the electric energy storage device 5, when the magnitude of the discharging current Ibd (detected value thereof) exceeds the discharging current limiting value Ld, the target assistive output established depending on operating stages of the hybrid vehicle such as the vehicle speed Vcar is corrected so as to be reduced. Therefore, the discharging current Ibd can be limited adequately. When the discharging current Ibd becomes equal to or smaller than the discharging current limiting value Ld by reducing the target assistive output, the corrective quantity $\Delta$Pm by which to reduce the target assistive output is reduced until the correction to reduce the target assistive output is canceled. Therefore, the correction to reduce the target assistive output is minimized.

By thus limiting the charging and discharging current Ib of the electric energy storage device 5, the regenerative or assistive operation of the generator/motor 2 can be performed with high energy efficiency.

In the illustrated embodiment, the generator/motor 2 generates electric energy in its regenerative operation when the hybrid vehicle is in the cruising regenerative mode, the generator/motor 2 may not generate electric energy in the cruising regenerative mode.

The generator/motor 2 may be controlled to operate as the electric motor in other running modes (e.g., a cruising mode) than the assistive running mode. Similarly, the generator/motor 2 may be controlled to operate as the electric generator, if necessary, while the hybrid vehicle is being accelerated.

Although a certain preferred embodiment of the present invention has been shown and described in detail, it should be understood that various changes and modifications may be made therein without departing from the scope of the appended claims.

What is claimed is:

1. A control system for controlling a hybrid vehicle having an engine as a vehicle propulsion source, an electric energy storage device for storing electric energy, and a generator/motor for selectively operating as an electric motor for generating an assistive output to assist in an output of the engine from the electric energy stored in the electric energy storage device and as an electric generator for generating electric energy to be stored in the electric energy storage device, said control system comprising:

generator/motor control means for controlling operation of said generator/motor to maintain a current passing through said electric energy storage device at a level equal to or smaller than a predetermined limiting value established depending on the amount of electric energy stored in said electric energy storage device, when said generator/motor operates as the electric motor, and to maintain a current passing through said electric energy storage device at another level equal to or smaller than another predetermined limiting value established depending on the amount of electric energy stored in said electric energy storage device when generator/motor operates as the electric generator.

2. A control system according to claim 1, wherein said generator/motor control means comprises means for increasing said limiting value as the amount of electric energy stored in said electric energy storage device is greater when said generator/motor operates as the electric motor.

3. A control system according to claim 1, further comprising current detecting means for detecting the current passing through said electric energy storage device, said generator/motor control means comprising means for establishing a target value of said assistive output when said generator/motor operates as the electric motor depending on at least an operating state of the hybrid vehicle and/or the amount of electric energy stored in said electric energy storage device, correcting the target value of said assistive output so as to be reduced when the current detected by said current detecting means exceeds said limiting value when said generator/motor operates as the electric motor, and controlling operation of said generator/motor depending on the corrected target value to keep the current passing through said electric energy storage device at the level equal to or smaller than said predetermined limiting value.

4. A control system according to claim 3, wherein said generator/motor control means comprises means for, after the target value of said assistive output is corrected so as to be reduced, canceling correcting the target value of said assistive output so as to be reduced when the current detected by said current detecting means is smaller than said limiting value when said generator/motor operates as the electric motor.

5. A control system according to claim 1, wherein said generator/motor control means comprises means for reducing said limiting value as the amount of electric energy stored in said electric energy storage device is greater when said generator/motor operates as the electric generator.

6. A control system according to claim 1, further comprising current detecting means for detecting the current passing through said electric energy storage device, said generator/motor control means comprising means for establishing a target value of the quantity of electric energy generated when said generator/motor operates as the electric generator depending on at least an operating state of the hybrid vehicle and/or the amount of electric energy stored in said electric energy storage device, correcting the target value of said quantity of generated electric energy so as to be reduced when the current detected by said current detecting means exceeds said limiting value when said generator/motor operates as the electric generator, and controlling operation of said generator/motor depending on the corrected target value to keep the current passing through said electric energy storage device at the level equal to or smaller than said predetermined limiting value.

7. A control system according to claim 6, wherein said generator/motor control means comprises means for, after the target value of said quantity of generated electric energy is corrected so as to be reduced, canceling correcting the target value of said quantity of generated electric energy so as to be reduced when the current detected by said current detecting means is smaller than said limiting value when said generator/motor operates as the electric generator.

8. A control system according to any one of claims 1 through 7, wherein said generator/motor control means comprises means for determining said limiting value depending on the amount of electric energy stored in said electric energy storage device and the temperature of said electric energy storage device.

9. A control system according to claim 1, wherein said electric energy storage device comprises an electric double-layer capacitor.

* * * * *